(12) United States Patent
Phare

(10) Patent No.: US 10,983,273 B1
(45) Date of Patent: Apr. 20, 2021

(54) INTEGRATED OPTICAL WAVEGUIDE EMITTER

(71) Applicant: Voyant Photonics, Inc., New York, NY (US)

(72) Inventor: Christopher T. Phare, New York, NY (US)

(73) Assignee: Voyant Photonics, Inc., New York, NY (US)

(*) Notice: Subject to any disclaimer, the term of this patent is extended or adjusted under 35 U.S.C. 154(b) by 0 days.

(21) Appl. No.: 16/946,448

(22) Filed: Jun. 22, 2020

(51) Int. Cl.
*G02B 6/12* (2006.01)

(52) U.S. Cl.
CPC ...... *G02B 6/12011* (2013.01); *G02B 6/12014* (2013.01); *G02B 6/12016* (2013.01); *G02B 2006/12107* (2013.01); *G02B 2006/12176* (2013.01)

(58) Field of Classification Search
None
See application file for complete search history.

(56) References Cited

U.S. PATENT DOCUMENTS

| 6,636,678 B1* | 10/2003 | Bendett | C03C 4/00 385/132 |
| 6,920,272 B2* | 7/2005 | Wang | G02B 6/12004 359/332 |
| 7,800,823 B2* | 9/2010 | Perkins | G02B 5/286 359/485.05 |
| 8,270,791 B2* | 9/2012 | Komura | G11B 5/314 385/37 |
| 8,666,211 B2* | 3/2014 | Kopp | G02B 6/1223 385/49 |

(Continued)

FOREIGN PATENT DOCUMENTS

| WO | 2019005823 A1 | 1/2019 |
| WO | 2019190577 A2 | 10/2019 |

OTHER PUBLICATIONS

Sacher et al., "Wide bandwidth and high coupling efficiency Si3N4-on-SOI dual-level grating coupler", Optics Express, vol. 22, No. 9, pp. 10938-10947, May 5, 2014.

(Continued)

*Primary Examiner* — Ryan A Lepisto
*Assistant Examiner* — Erin D Chiem
(74) *Attorney, Agent, or Firm* — Stratford Managers Corporation

(57) ABSTRACT

The optical phased array may use a grating based emitter in order to emit light out of the plane of a PIC chip from an array of output waveguides. A longer grating allows for a larger aperture in the output waveguide dimension and allows for a small spot size. However, even for the relatively thick grating layers available in production foundries, the gratings still cause light to decay within less than 0.5 mm. To reduce the grating strength, some or all of the diffraction gratings may only be provided between the output waveguides, e.g. over trenches between the output waveguides, but not over top the output waveguides, whereby the periodicity only interacts with the weaker evanescent tails of the confined mode instead of the entire cross section of the output waveguides. By forming sufficiently narrow slots in the grating layer only down to the upper cladding layer, the diffraction gratings may be made extremely weak.

20 Claims, 18 Drawing Sheets

(56) References Cited

U.S. PATENT DOCUMENTS

| | | | | |
|---|---|---|---|---|
| 10,746,925 B2* | 8/2020 | Jacob | ............... | G02B 6/124 |
| 2004/0156589 A1* | 8/2004 | Gunn, III | ............... | G02B 6/124 |
| | | | | 385/37 |
| 2009/0154871 A1* | 6/2009 | Pyo | ............... | G02B 6/124 |
| | | | | 385/14 |
| 2009/0290837 A1* | 11/2009 | Chen | ............... | G02B 6/34 |
| | | | | 385/37 |
| 2010/0246617 A1* | 9/2010 | Jones | ............... | G02B 6/29325 |
| | | | | 372/26 |
| 2011/0133063 A1* | 6/2011 | Ji | ............... | G02B 6/124 |
| | | | | 250/227.24 |

OTHER PUBLICATIONS

Xu et al., "High-efficiency wideband SiNx-on-SOI gratingcoupler with low fabrication complexity", Optics Letters, vol. 42, No. 17, pp. 3391-3394, Aug. 24, 2017.

* cited by examiner

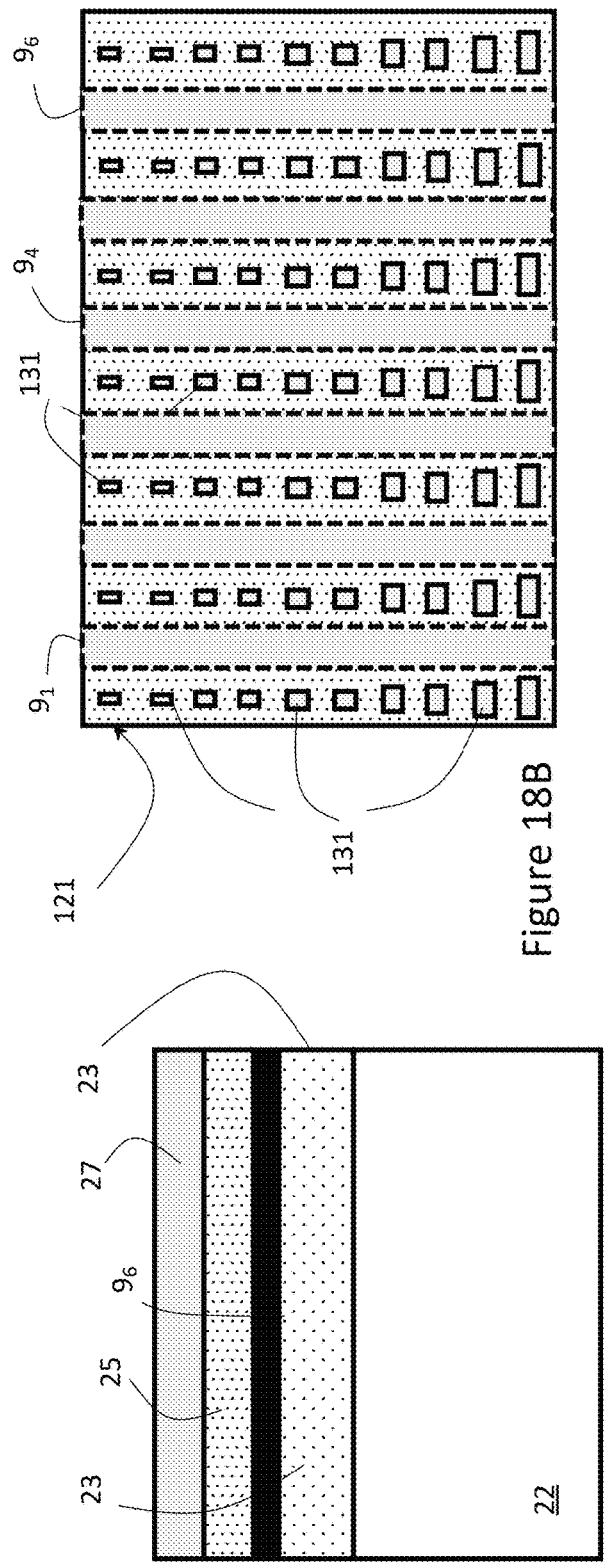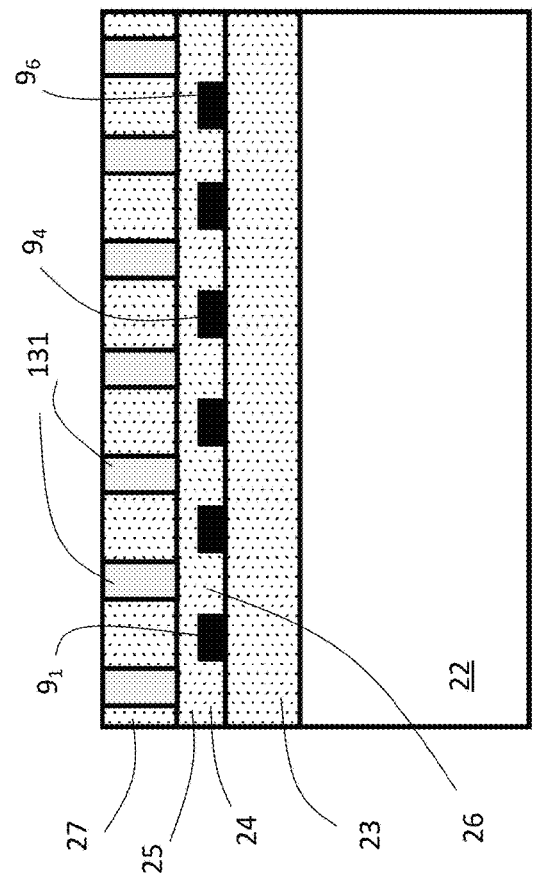
Figure 18A
Figure 18B
Figure 18C

INTEGRATED OPTICAL WAVEGUIDE EMITTER

STATEMENT REGARDING FEDERALLY SPONSORED RESEARCH OR DEVELOPMENT

This application was made with government support under FA8650-19-C-7919 awarded by the Defense Advanced Research Projects Agency (DARPA). The federal government has certain rights in the invention.

TECHNICAL FIELD

The present invention relates to an integrated optical waveguide emitter, and in particular to an integrated optical waveguide emitter with a weak grating for integrated optical phased arrays.

BACKGROUND

An optical phased array (OPA) transmitter includes a light source, power splitters, phase shifters, and an integrated optical waveguide emitter comprising an array of radiating waveguide elements. The output light of the light source is split into sub-beams and transmitted along several branches using a power splitting network of waveguides. Each branch is then fed to a tunable phase shifter. The phase shifted light is input into a plurality of radiating waveguide elements, e.g. a nanophotonic antenna, that couple the light into free space. Light emitted by the radiating waveguide elements is combined in the far-field and forms a far-field pattern of the OPA array. By adjusting the relative phase shift between the radiating waveguide elements, an output beam of light can be formed and steered.

Conventional integrated optical phased arrays launch and receive beams of light at a variety of controllable angles for various applications, including free-space communications, holography, and light detection and ranging (LIDAR). A LIDAR sensor is an optical remote sensor that measure the distance to a target, by irradiating the target with light, using pulses or a modulated signal from a laser, and measuring the time it takes the light to travel to and from the target to a receiver in the LIDAR sensor. When, the reflected pulses or modulated signals are detected, the time of flight of the pulses or modulated signals correspond to the distance to the sensed target. LIDAR sensors are important components in autonomous vehicles, drone navigation systems, and robot interaction, but is currently costly and relatively large. Accordingly, smaller and less expensive solid-state LIDAR sensors are desirable. An integrated optical phased array includes a plurality of spaced-apart waveguide emitter fabricated on a chip, and comprised of any suitable dielectric or semiconductor material. Each waveguide emitter carries an optical beam of light, which combine into a single narrow combined beam after leaving the chip. The angle that the combined beam may be directed can be controlled by changing the relative phase of the optical beam of light in each waveguide emitter. The spacing between adjacent waveguide emitters controls several important properties, including the range of unique angles that the combined beam can be directed; and the efficiency with which reflected light can be coupled back into the array from free space.

An object of the present invention is to overcome the shortcomings of the prior art by providing a weak grating for a large and robust integrated optical waveguide emitter.

SUMMARY OF THE INVENTION

Accordingly, the present disclosure relates to an optical phased array comprising:
a light source for launching a beam of light;
a splitting network of waveguides, including an input and a plurality of outputs, configured to separate the beam of light into a plurality of sub-beams;
a plurality of optical phase shifters configured for adjusting a phase of each of the sub-beams;
an emitter comprising:
a lower cladding layer;
a plurality of output waveguides optically coupled to the plurality of outputs, with trenches therebetween, each output waveguide extending in a transmission direction from an inner end proximate the light source to an outer free end;
an upper cladding layer over the plurality of output waveguides;
a grating layer over the upper cladding layer;
an array of slots in the grating layer, comprising a plurality of columns of slots and a plurality of rows of slots extending down to the upper cladding layer above the trenches, configured to form a diffraction grating for directing light out of the output waveguides at an angle thereto.

Another aspect of the disclosure relates to an optical phased array comprising:
a light source for launching a beam of light;
a splitting network of waveguides, including an input and a plurality of outputs, configured to separate the beam of light into a plurality of sub-beams;
a plurality of optical phase shifters configured for adjusting a phase of each of the sub-beams;
an emitter comprising:
a lower cladding layer;
a plurality of output waveguides optically coupled to the plurality of outputs, with trenches therebetween, each output waveguide extending in a transmission direction from an inner end proximate the light source to an outer free end;
an upper cladding layer over the plurality of output waveguides;
a grating layer over the upper cladding layer;
an array of pillars in the grating layer, comprising a plurality of columns of pillars and a plurality of rows of pillars extending down to the upper cladding layer above the trenches between the output waveguides, configured to form a diffraction grating for directing light out of the output waveguides at an angle thereto.

Another aspect of the present disclosure relates to a method of manufacturing an integrated optical waveguide emitter comprising:
providing an array of output waveguides comprised of a first material comprising a first index of refraction with trenches therebetween on a lower cladding layer;
providing an upper cladding layer comprised of a second material comprising a second index of refraction lower than the first index of refraction over the array of output waveguides;
providing a grating layer over the upper cladding layer, the grating layer comprised of a third material with a third index of refraction between the first index of refraction and the second index of refraction;
forming an array of slots in the grating layer, comprising a plurality of lines of slots and a plurality of rows of slots extending down to the upper cladding layer only above the trenches between the output waveguides, configured to form a diffraction grating for directing light out of the output waveguides at an angle thereto.

BRIEF DESCRIPTION OF THE DRAWINGS

The invention will be described in greater detail with reference to the accompanying drawings which represent preferred embodiments thereof, wherein:

FIGS. 18A, 18B and 18C are side, top and end views, respectively, illustrating an alternative fifth step in the exemplary method of manufacturing the grating based emitter of the present invention;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

LIDAR detection methods can be split up into two major categories: time-of-flight (TOF) and coherent detection methods. TOF detection methods normally involve transmitting a pulse of light, and then directly detecting the time needed for the light to reflect off a target and return back to the receiver module of the LIDAR system. Coherent detection methods differ from TOF methods in that they coherently beat the received signal with a local oscillator (LO). Frequency-modulated continuous wave (FMCW) is a commonly used coherent detection method in LIDAR. In this method, a low-speed beat frequency that is proportional to the distance of the target is measured instead of the direct TOF. A major difference between TOF and coherent detection methods is the resulting signal power, as TOF methods result in low power and require special photodetectors. However, for coherent detection methods, the received signal is first beaten with a LO which increases the signal power. Since it is coherent, the power that is observed is proportional to the power of the reflected light and the power of the LO. This signal boost from the local oscillator may enable the use of conventional photodetectors.

Figure 1:
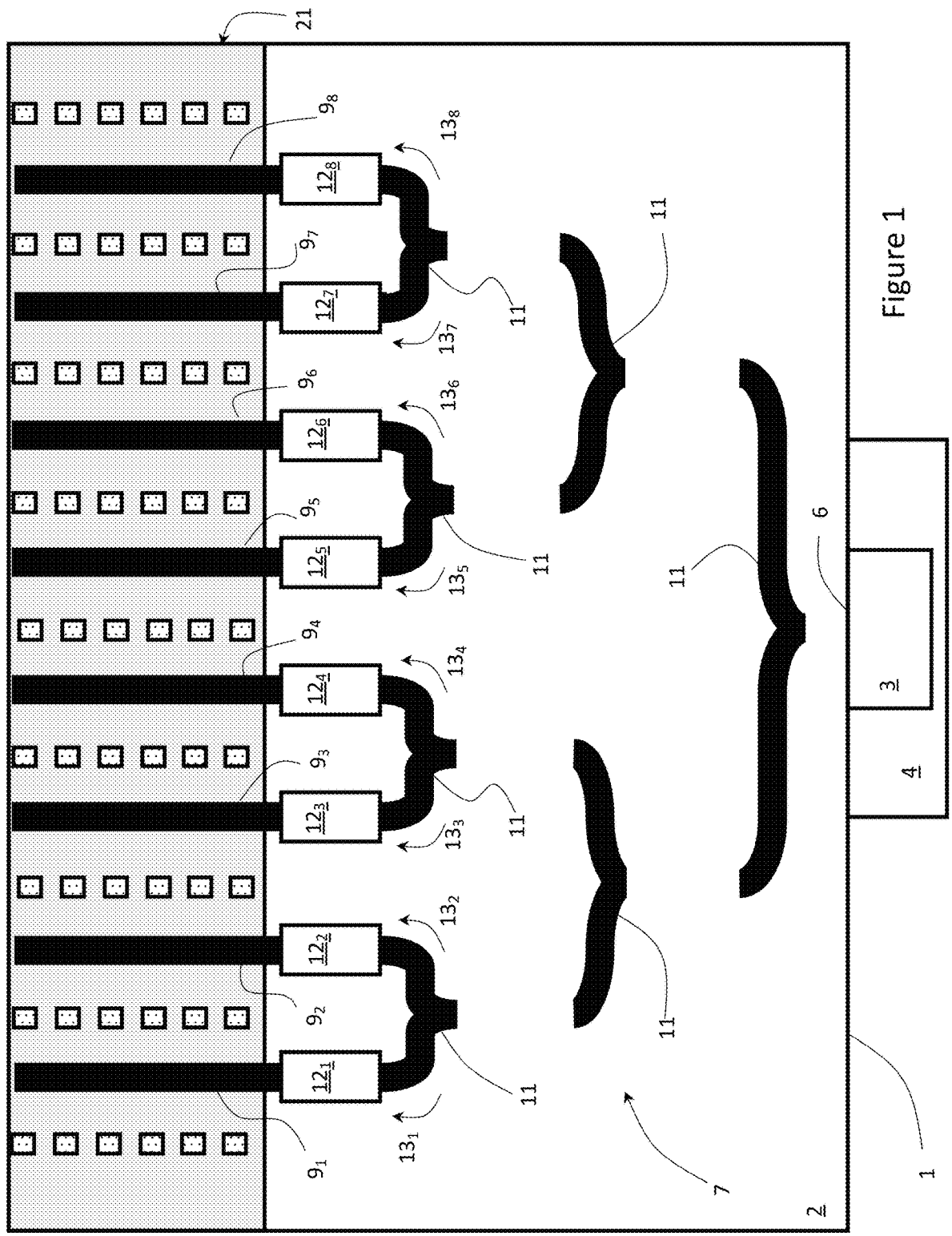
FIG. 1 is a schematic diagram of an optical phased array in accordance with an embodiment of the present invention.
Figure 2:
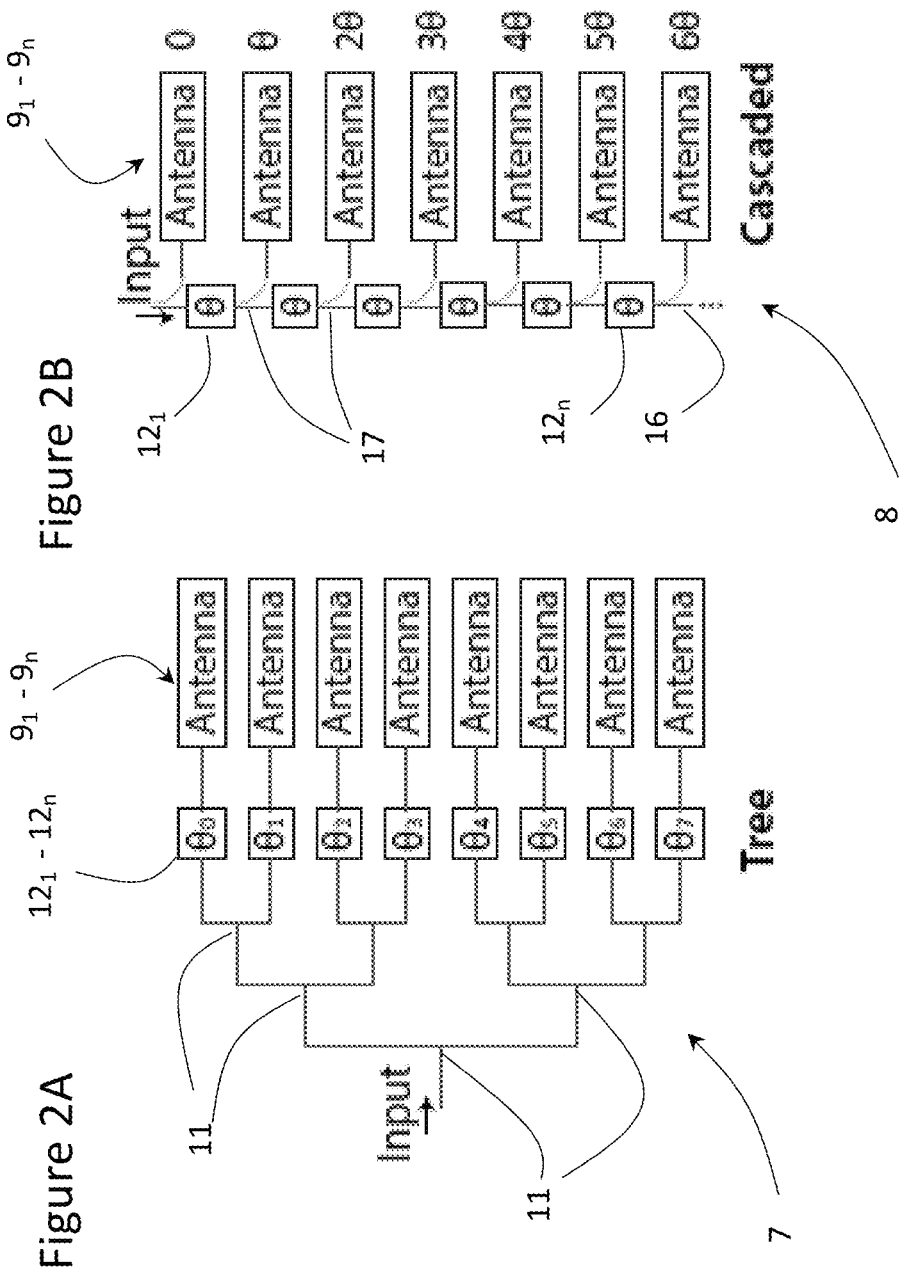
FIG. 2A is a schematic diagram of an embodiment of a splitting network of waveguides for the device of FIG. 1.
FIG. 2B is a schematic diagram of an alternative embodiment of a splitting network of waveguides for the device of FIG. 1.

An optical phased array 1, in accordance with an embodiment of the present disclosure, may be integrated onto a photonic integrated circuit (PIC) chip 2, and may include a light source 3, e.g. a laser, mounted on the PIC chip 2 or on a separate laser chip 4 connected adjacent thereto. The light source 3 is optically coupled to an input port 6 for launching an input beam of light into the optical phased array 1. The optical phased array 1 may include a tree-like splitting network of waveguides 7 (FIGS. 1 and 2A) or a cascaded splitting network of waveguides 8 (FIG. 2B). The tree-like splitting network of waveguides 7 may comprise a 1×n splitter network, where n is the number of resultant output waveguides $9_1$ to $9_n$, i.e. antennas. The tree-like splitting network of waveguides 7 may comprise: 1) a plurality of 1×2 optical splitters 11, e.g. Y-couplers or MMI couplers, in cascaded layers; 2) a single 1×n splitter; or 3) any other combination of splitters to haven output waveguides $9_1$ to $9_n$ at the last layer of the tree, each output waveguide $9_1$ to $9_n$ having a corresponding phase shifter $12_1$ to $12_n$. The cascaded splitting network of waveguide 8 (FIG. 2B) may comprise a single bus waveguide 16 with alternating directional coupler taps 17. Accordingly, the phase shifters $12_1$ to $12_n$ are cascaded, i.e. changing the phase of one of the phase shifters $12_1$ to $12_n$ will change the phase of all output waveguides $9_1$ to $9_n$ thereafter. The cascaded splitting network of waveguides 8 illustrated in FIG. 2B includes all the phase shifters $12_1$ to $12_n$ at the same phase, greatly simplifying the control system by enabling a single control signal to be transmitted to each phase shifter $12_1$ to $12_n$.

The network of waveguides 7 or 8 may be optically coupled to the input port 6 to separate the input beam of light from the light source 3 into a plurality of sub-beams $13_1$ to $13_n$ transmitted over a respective one of the plurality of output waveguides $9_1$ to $9_n$ (n=8 in the illustrated embodiment but more splitters 11, sub-beams 12 and output waveguides 9 are possible).

The actuation mechanisms used in each phase shifter $12_1$ to $12_n$, may be any of a variety of mechanisms, including but not limited to: thermo-optic actuation, electro-optic actuation electro-absorption actuation, free carrier absorption actuation, magneto-optic actuation, liquid crystal actuation, and all-optical actuation.

The optical phased array 1 may use a grating based emitter 21 in order to emit light out of the plane of the PIC chip 2 from the output waveguides $9_1$ to $9_n$. For one-dimensional waveguide phased arrays 1, the gratings may be oriented perpendicular to the longitudinal axis of the output waveguides $9_1$ to $9_n$, i.e. the transmission direction of the sub-beams $13_1$ to $13_n$, and enable the light to be emitted at an emission angle φ. A longer grating allows for a larger aperture in the output waveguide dimension and allows for a small spot size in the φ dimension. Two-dimensional steering may be accomplished with the optical phased array 1 using wavelength tuning. For a grating with a single order, the wavelength dependence of the emission angle, φ, is given by $\sin(\varphi) = n_{eff} - \lambda/\Lambda$, where neff is the effective index of refraction of the guided mode, and $\Lambda$ is the pitch of the grating.

Figure 3:
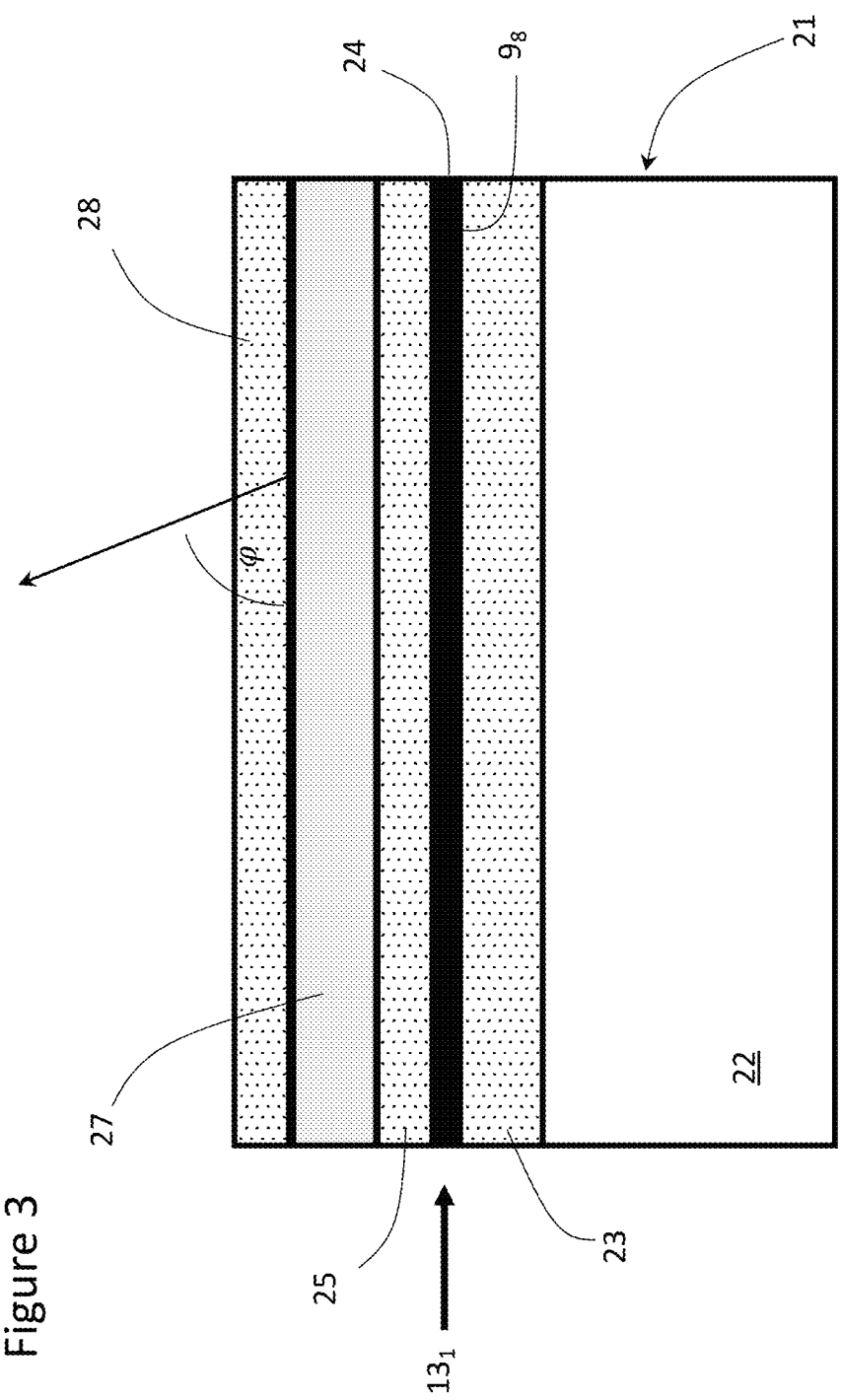
FIG. 3 is a side view of a grating based emitter of the device of FIG. 1.
Figure 4:
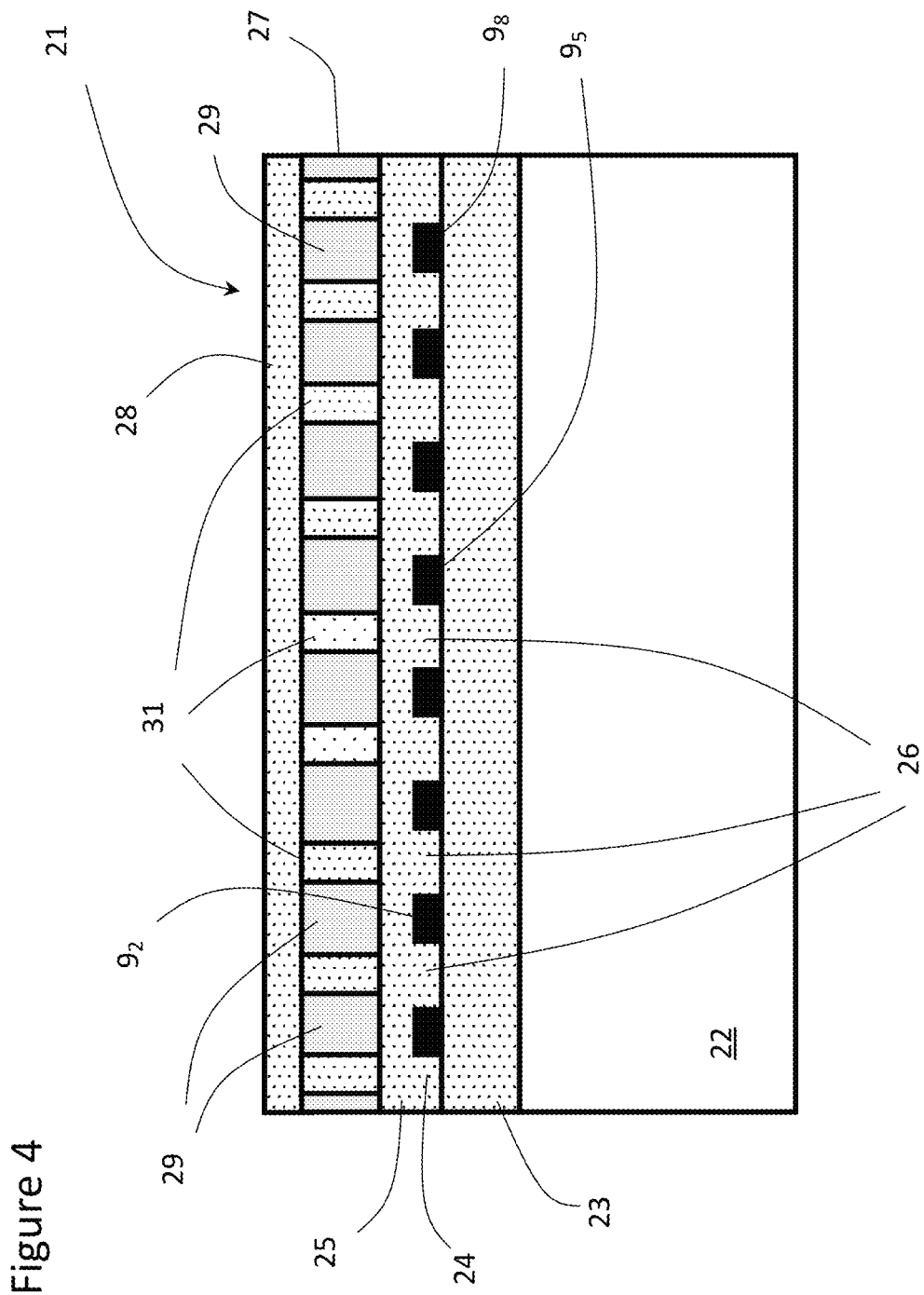
FIG. 4 is an end view of the grating based emitter of the device of FIG. 3.
Figure 5:
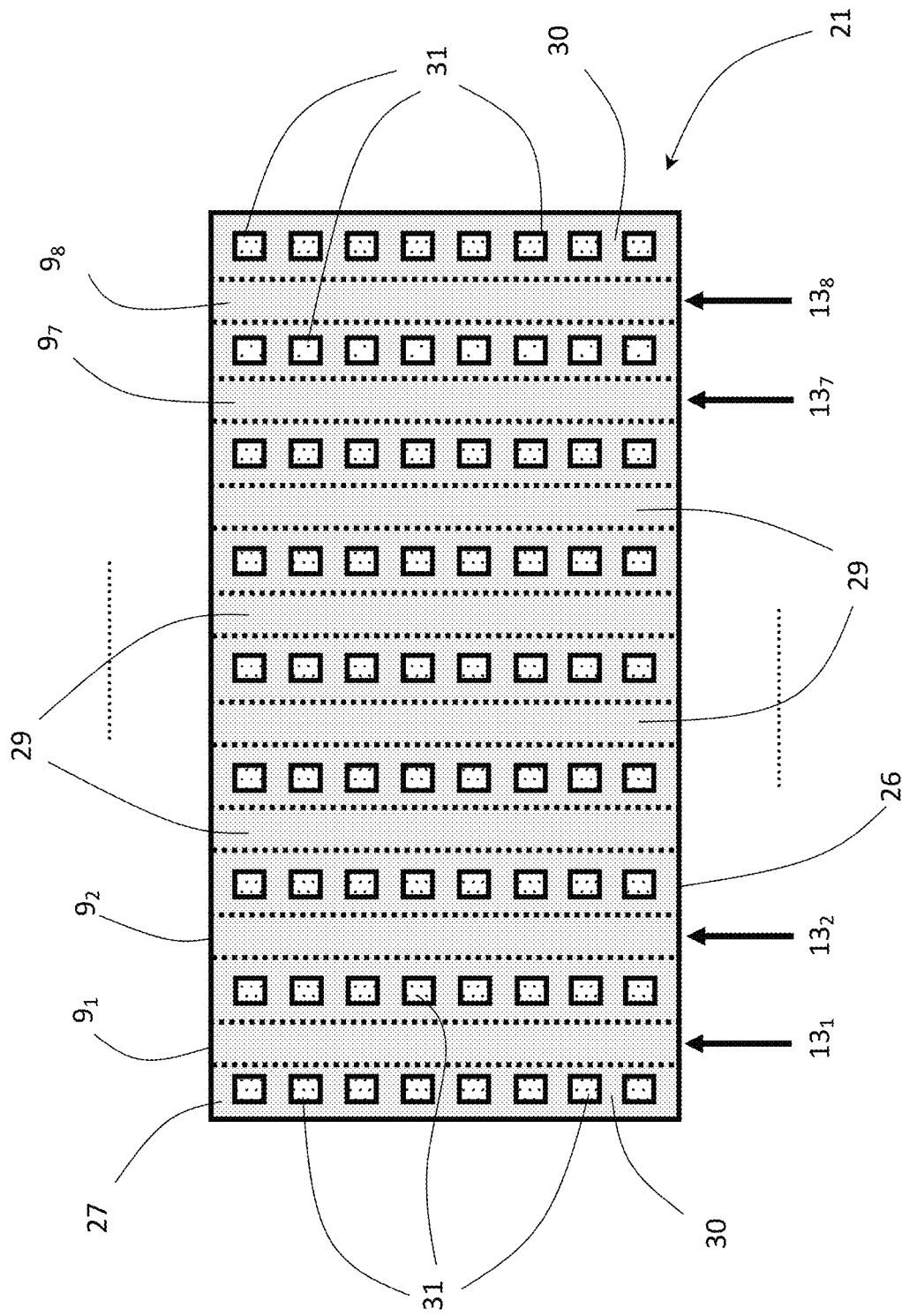
FIG. 5 is a top view of the grating based emitter of the device of FIG. 3.

With reference to FIGS. 3, 4 and 5, the grating based emitter 21 may comprise a substrate 22 on which a waveguide structure and a grating structure is mounted. The waveguide structure may comprise a lower cladding layer 23, a waveguide layer 24, and an upper cladding layer 25. The upper and lower cladding layers 23 and 25 typically comprised of a lower index of refraction material, e.g. a dielectric or oxide material, such as silicon dioxide ($SiO_2$), and the waveguide layer 24 typically comprises a higher index of refraction semiconductor material, such as Silicon (Si), but other suitable materials are possible. The waveguide layer 24 includes the output waveguides $9_1$ to $9_n$.

A grating layer 27 is mounted over the upper cladding layer 25, and may comprise a dielectric material with an index of refraction between the waveguide layer 24 and the upper cladding layer 25, such as silicon nitride ($Si_3N_4$ or SiN). Because most of the light is confined within the output waveguides $9_1$ to $9_n$, and the grating layer 27 has a relatively lower index contrast with the waveguide layer 24 than the cladding layer 25, the resulting diffraction gratings 30 are quite weak. With a sufficiently thin grating layer 27, e.g. less than 100 nm, the light may propagate several mm before decaying. However, for the relatively thick, e.g. 300 nm-500 nm, SiN available in production foundries, the gratings cause light to decay within less than 0.5 mm. An additional cover (cladding) layer 28, e.g. $SiO_2$, may be provided over the grating layer 27.

To reduce the grating strength, some or all of the diffraction gratings 30 may only be provided between the output waveguides $9_1$ to $9_n$, e.g. over trenches 26 between the output waveguides $9_1$ to $9_n$, but preferably not over top the output waveguides $9_1$ to $9_n$, whereby the periodicity only interacts with the weaker evanescent tails of the confined mode instead of the entire cross section of the output waveguides $9_1$ to $9_n$. By forming sufficiently narrow slots 31 in the grating layer 27 only down to the upper cladding layer 25, the diffraction gratings 30 may be made extremely weak. The diffraction gratings 30 may comprise an array of slots 31 comprising a plurality of equally-spaced columns of slots, one of the plurality of columns extending over each trench 26, and a plurality of equally-spaced rows of slots separated by spacers formed of material in the grating layer 27 and extending perpendicular to the trenches 26. The width of each slot 31 may range from narrower than and only over the trench 26, i.e. not overlapping adjacent output waveguides $9_1$ to $9_n$, to wider than the trench 26, e.g. over top of adjacent output waveguides $9_1$ to $9_n$, with spacers 29 comprised of material from the grating layer 27 over the longitudinal central axis of the output waveguides $9_1$ to $9_n$, spacing the slots 31 apart. The spacers 29 may be greater than 25% of the width of each output waveguide $9_1$ to $9_n$, and preferably vary from 25% to 200%, preferably 25% to 100%, of the width of each output waveguide $9_1$ to $9_n$. The slots 31 may be filled with a lower index of refraction material, such as the same material as the upper cladding 25. In principle, the same effect could be achieved with pillars, rather than slots 31, between the output waveguides $9_1$ to $9_n$, as in FIG. 11.

If the gratings strength is constant along the output waveguides $9_1$ to $9_n$, the total emission will have a nonlinear, e.g. exponential profile, since some of the light is emitted along the diffraction gratings 30 and the intensity of light in the output waveguides $9_1$ to $9_n$ is reduced as the diffraction gratings 30 gets further from the light source 3, i.e. along the longitudinal axis of the output waveguides $9_1$ to $9_n$ in the transmission direction. Thus, to obtain a uniform output profile, the diffraction gratings 30 may be configured so that they are less strong, i.e. higher confinement and emit less light, in the beginning of the grating structure, closer to the light source 3, and increase in strength, i.e. decrease in confinement and increase in light emission, as the distance from the light source 3 is increased. That way the overall emission due to the grating strength and light intensity in the output waveguides $9_1$ to $9_n$ may be made uniform along an entire millimeter structure.

Figure 6:
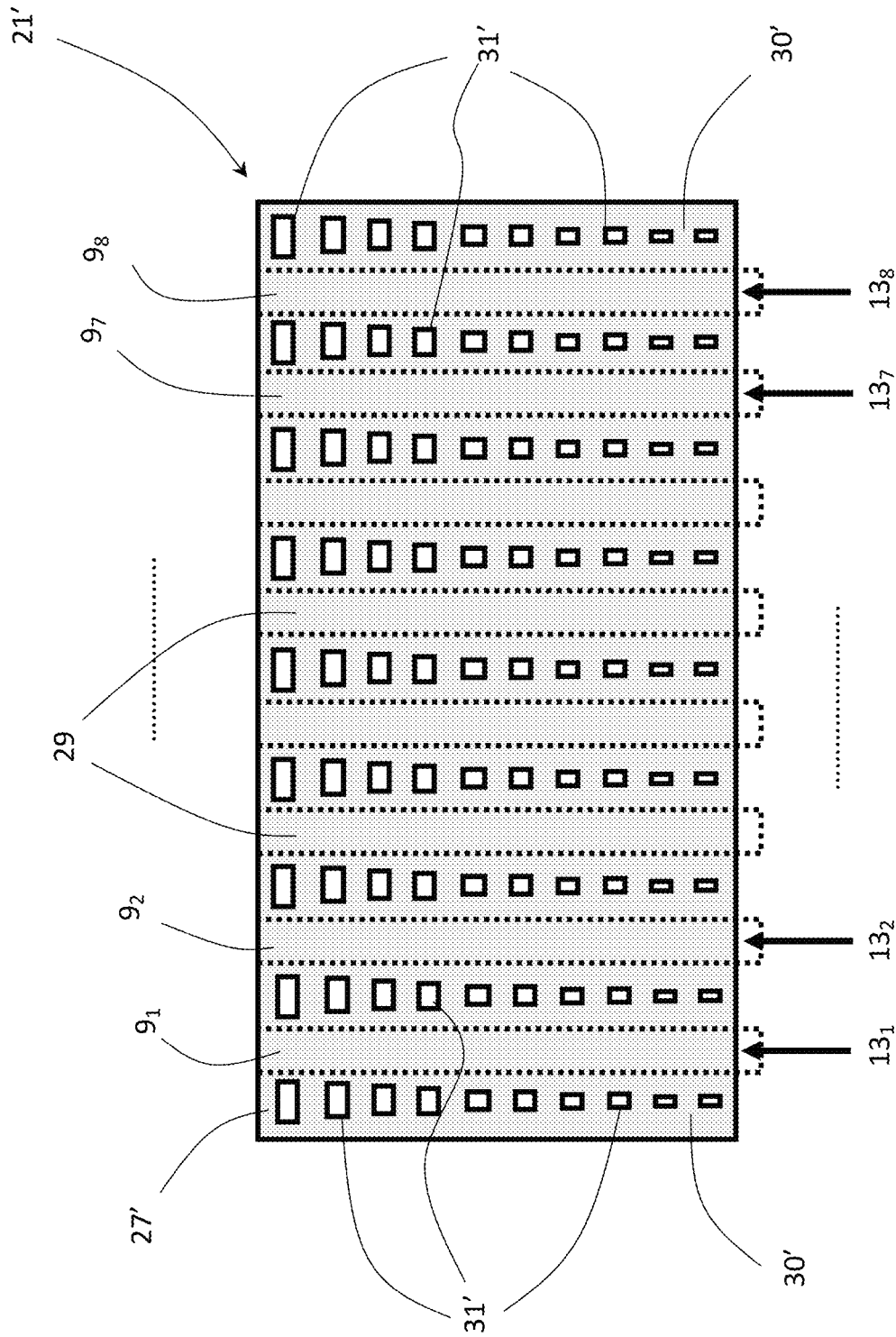
FIG. 6 is a top view of an alternative slot arrangement for the grating based emitter of the device of FIG. 3.
Figure 7:
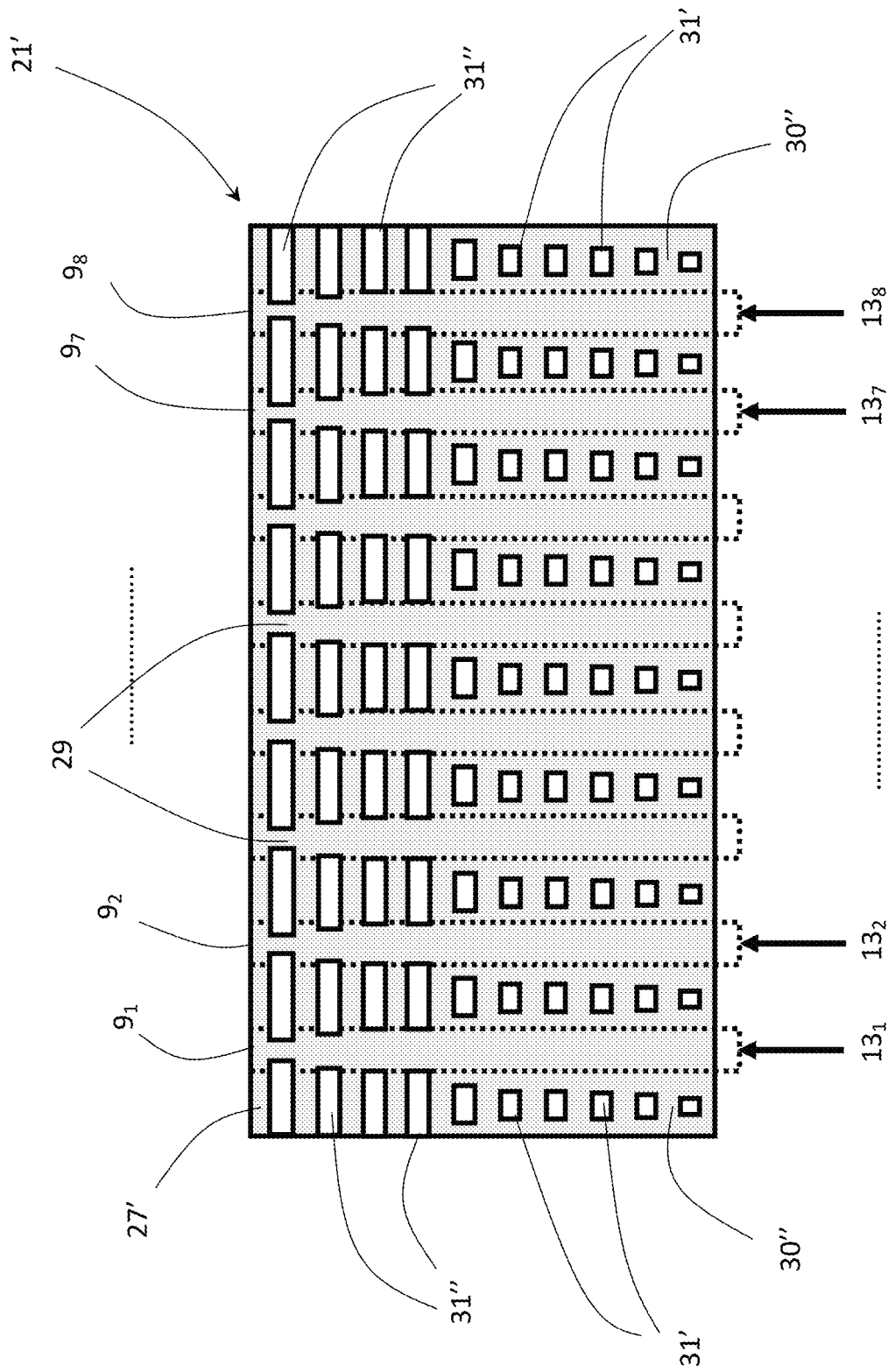
FIG. 7 is a top view of an alternative slot arrangement for the grating based emitter of the device of FIG. 3.

In a preferred embodiment, illustrated in FIGS. 6 and 7, the apodization of the light may be adjusted by varying the widths of the slots 31. For example, in a grating based emitter 21' with diffraction gratings 30', slots 31' may have the same period in each column of slots 31', i.e. same distance from the leading edge of one slot 31' to the leading edge of the next slot 31', and may have the same pitch, i.e. same length of slot 31' in the transmission direction; however, the widths of at least some of the slots 31', i.e. perpendicular to the transmission direction, may be gradually increased in each column as the distance from the light source 3 increases. Slots 31' in a first row proximate or closest to the light source 3 may be starting at approximately 20%-30% of the width of the trench 26, with slots 31' moving to approximately 50%-75% of width of the trench 26 in the last row of slots by the outer free ends of the output waveguides $9_1$ to $9_n$. Accordingly, the grating strength is tunable by over two orders of magnitude, allowing for significant apodization of the diffraction gratings 30' along the aperture. If stronger diffraction gratings 30" are required, wider slots may be included, e.g. including slots 31" that extend the entire width of the trenches 26, e.g. in the last one to five rows of slots, and/or including slots 31" that extend wider than the width of the trenches 26, e.g. partially over the output waveguides $9_1$ to $9_n$, as in the last plurality of rows of slots in FIG. 7.

Figure 8:
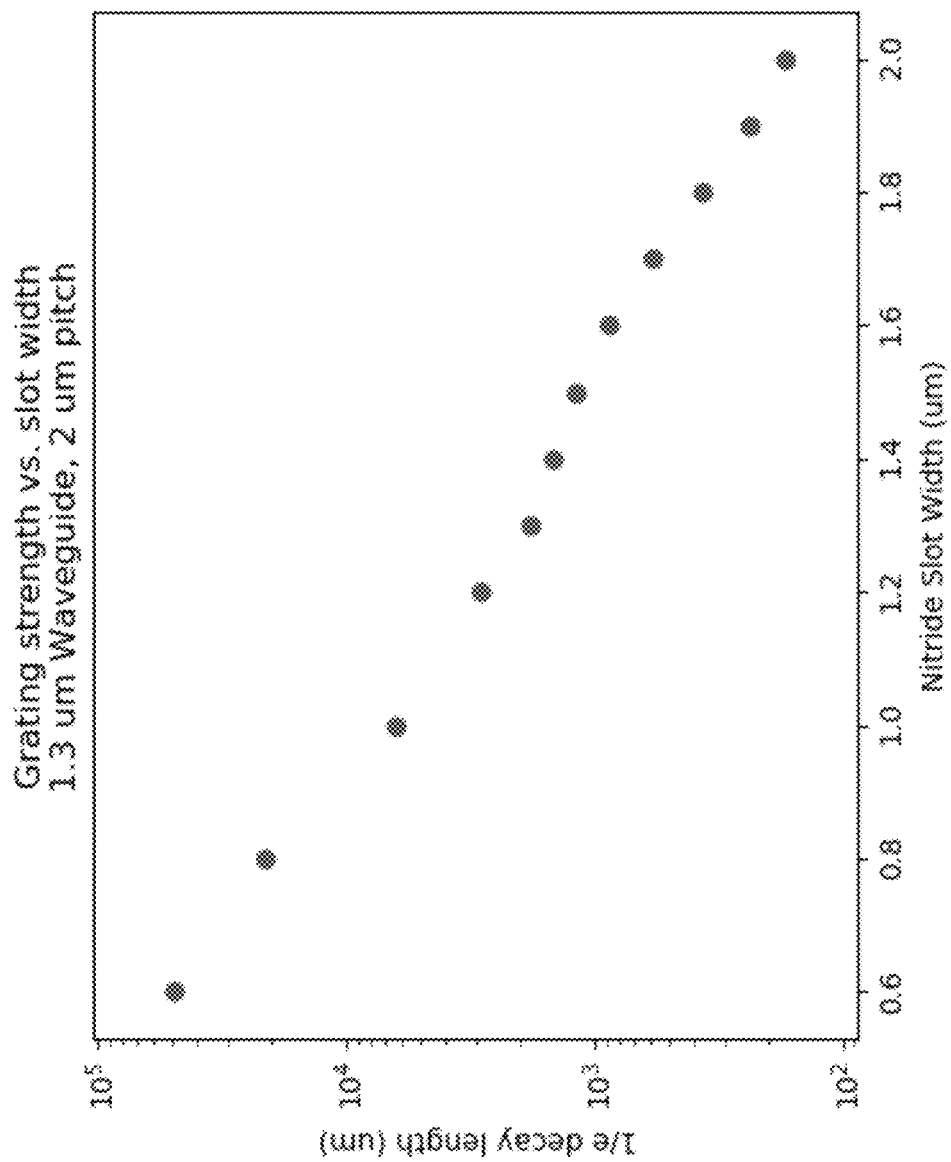
FIG. 8 is a plot of grating strength vs slot width for the grating based emitter of the device of FIG. 3.

An example grating-based emitter 21 includes output waveguides $9_1$ to $9_n$ with a width of 0.3 μm to 1.5 μm, preferably 1.0 μm to 1.3 μm, and a pitch of 0.775 μm to 2.2 μm, preferably 1.75 μm to 2 μm, i.e. trench widths of 0.7 μm to 1.2 μm, with varying widths of slots 31 or 31', e.g. 0.6 μm to 2.0 μm. Preferably, the slots 31 or 31' included a constant 500 nm-750 nm, preferably 600 nm, grating period, and a constant 50% grating duty cycle in the transmission direction. The preferred grating period depends on the width of the output waveguides $9_1$ to $9_n$, the refractive index of the output waveguides $9_1$ to $9_n$, the upper cladding 25, and the grating layer 27, and may be configured such that the light emits at the desired emission angle cp. When light is launched from the beginning of the output waveguides $9_1$ to $9_n$, and propagates along 120 μm of the emitter 21, average power (Poynting vector) can be extracted versus propagation distance. The constant-strength diffraction gratings 30 (FIG. 6) creates an exponential decay of power. FIG. 8 illustrates the power decay as the "grating strength", i.e. the decay constant of the exponential 1/e vs the width of slots 31/31'/31", as calculated from 3-dimensional finite difference time domain simulations of the optical phased array 1. Poynting vector versus propagation distance is extracted from the simulation and fit with an exponential decay, and the decay constant from each fit plotted in FIG. 8. Narrow slots 31'/31", because they impinge on the electric field of the output waveguides $9_1$ to $9_n$ less, create a weaker grating, i.e.

a longer 1/e decay length exceeding 1 cm for slot widths below 0.8 μm. On the other hand, wider slots 31/31'/31" create a stronger grating, with a decay length less than 500 μm for slot widths exceeding 1.7 μm. Note that grating strengths longer than 2 cm are easily achievable, enabling large aperture phased arrays.

Figure 9:
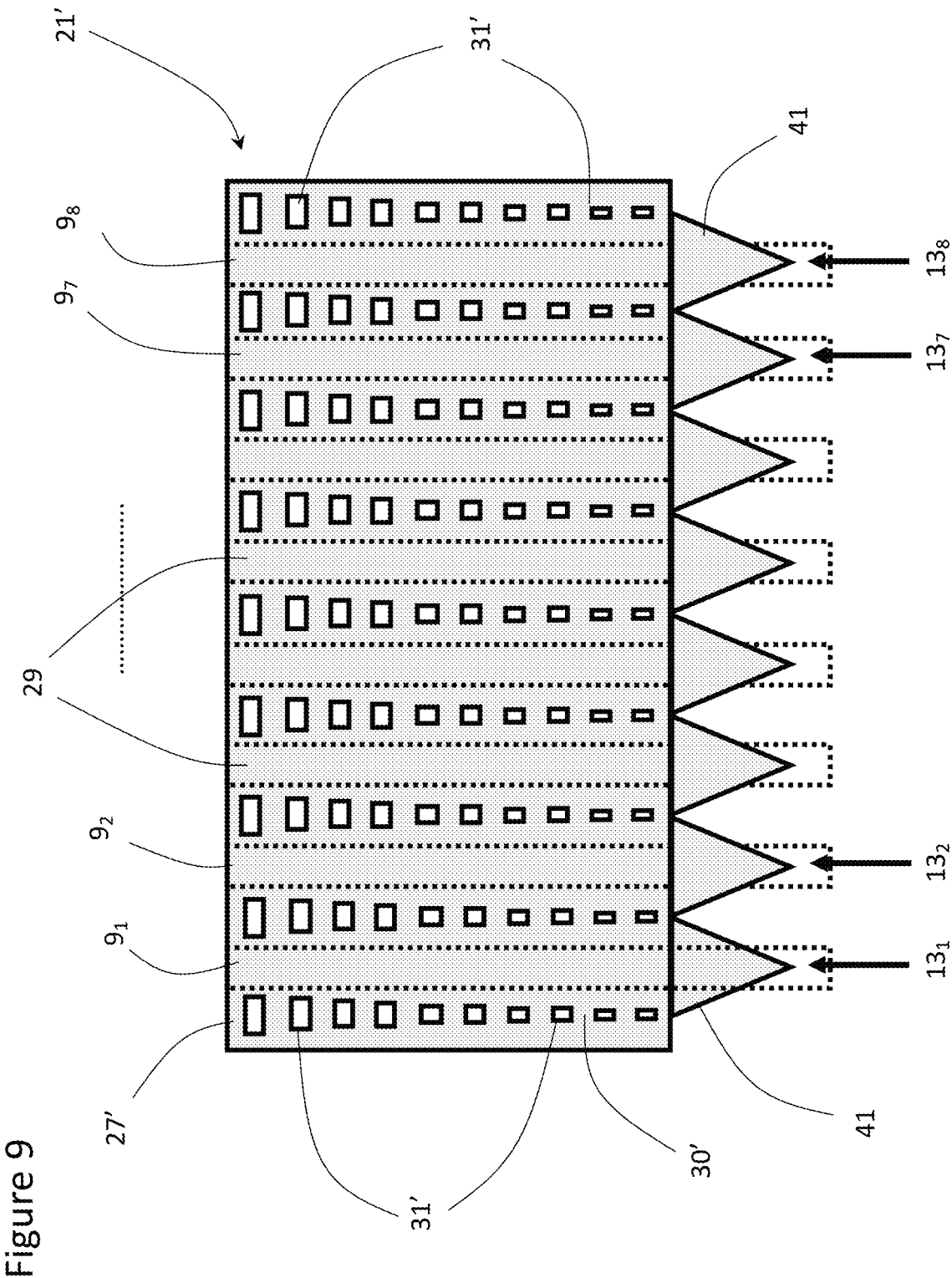
FIG. 9 is a top view of an alternative input arrangement for the grating based emitter of the device of FIG. 3.
Figure 10:
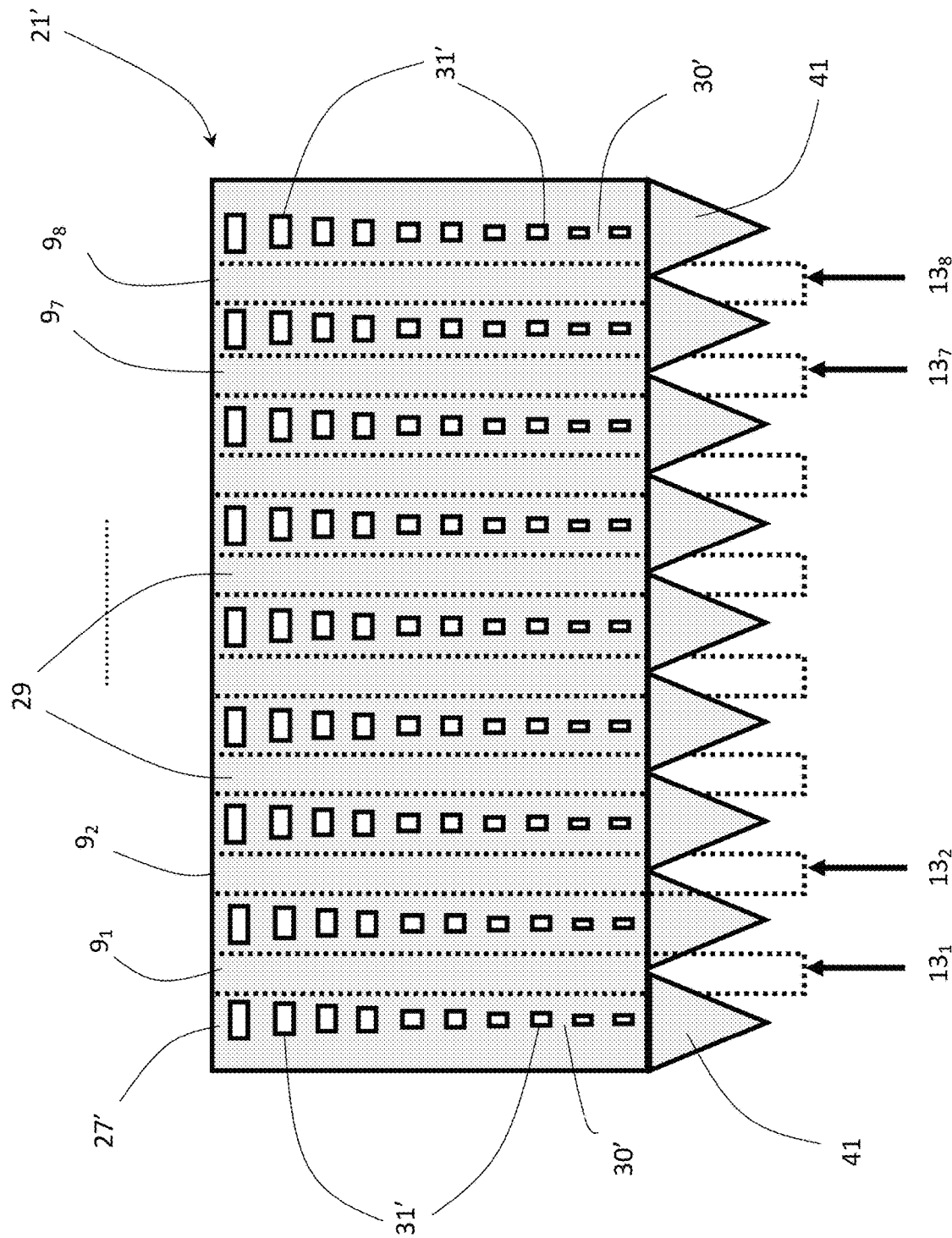
FIG. 10 is a top view of an alternative input arrangement for the grating based emitter of the device of FIG. 3.

An alternate implementation, illustrated in FIGS. 9 and 10, includes the grating layer 27 including tapered inputs 41 over the output waveguides $9_1$ to $9_n$ along the transmission length, rather than introducing the grating layer 27 suddenly. The tapered inputs 41 may comprise a length of from 5 μm-200 μm in the transmission direction. The idea is to adiabatically change the effective index of the output waveguides $9_1$ to $9_n$ to avoid any abrupt transitions that could (1) create back-reflections into the waveguide or (2) scatter light upwards as a very strong initial grating "tooth." The tapered inputs 41 may expand from a point, e.g. as small as manufacturing processes allow, to wider (e.g. 2×) than the widths of the output waveguides $9_1$ to $9_n$, whereby the inner ends of the tapered inputs 41 are contiguous and continuous. FIG. 9 illustrates tapered inputs 41 which converge to a point over top of the output waveguides $9_1$ to $9_n$, e.g. along a longitudinal center line thereof which expand to meet over top of a longitudinal center line of the trench 26 therebetween. FIG. 10 illustrates tapered inputs 41 which converge to a point over top of the trench 26, e.g. the longitudinal center line, between the output waveguides $9_1$ to $9_n$, which then expand to meet over top of, e.g. the longitudinal center line, of the output waveguides $9_1$ to $9_n$.

Figure 11:
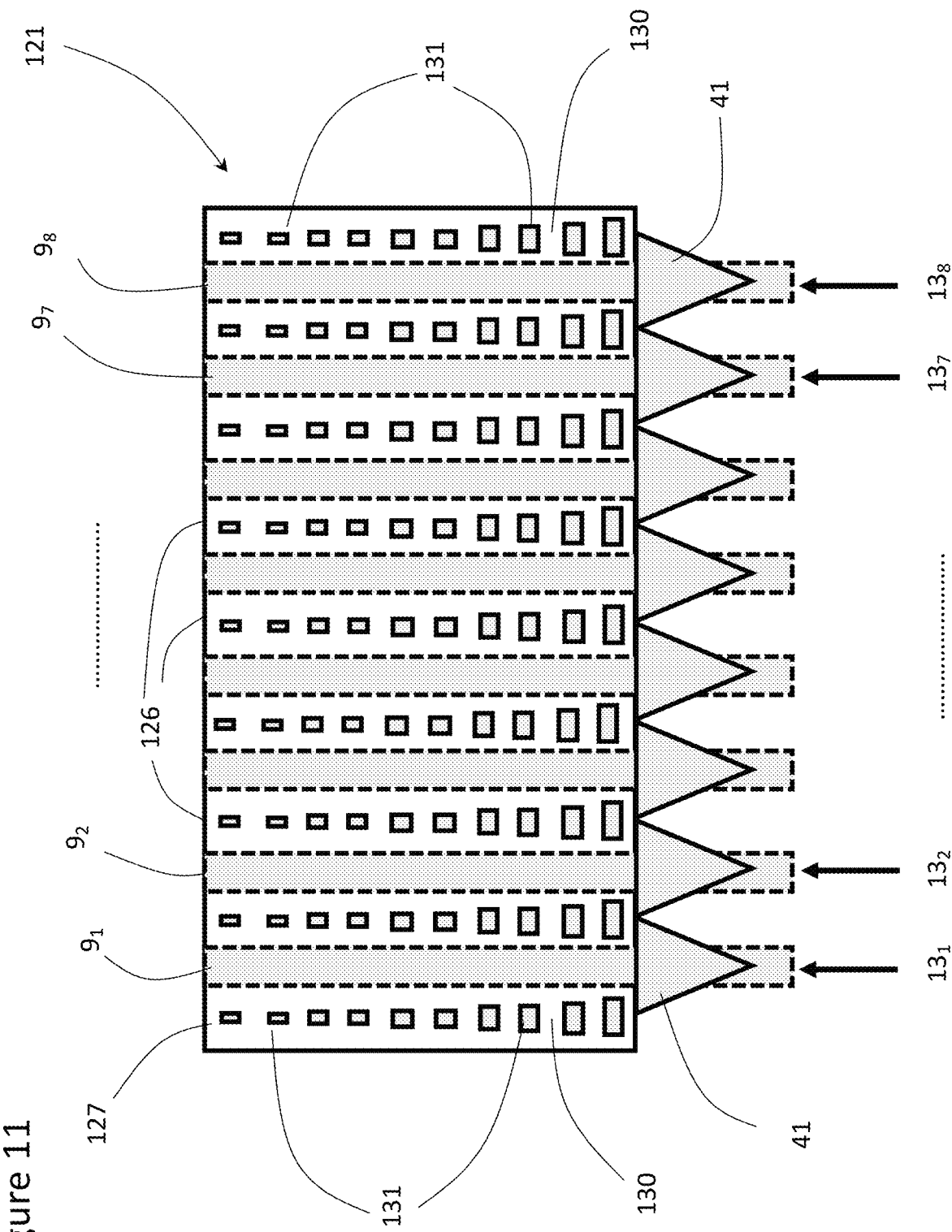
FIG. 11 is a top view of an alternative grating based emitter of the device of FIG. 1.
Figure 12B:
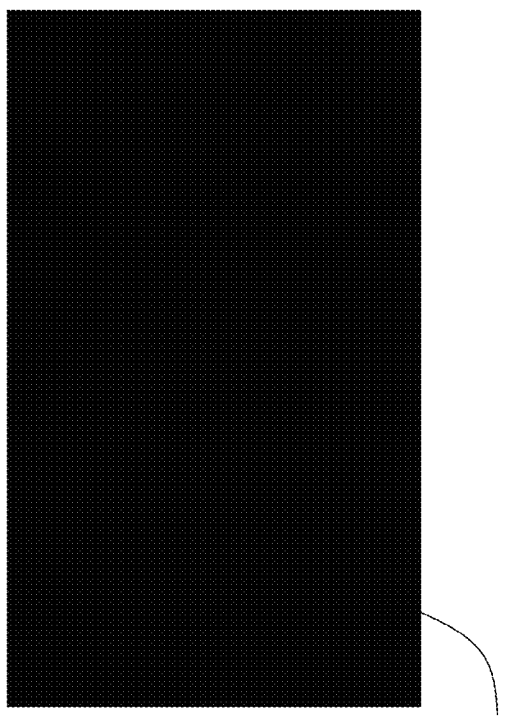
FIGS. 12A, 12B and 12C are side, top and end views, respectively, illustrating a first step in an exemplary method of manufacturing the grating based emitter of the present invention.
Figure 12C:
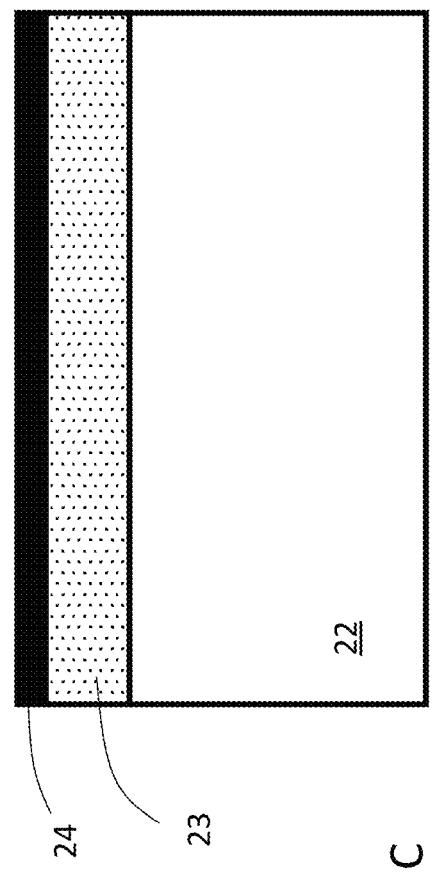
Figure 12A:
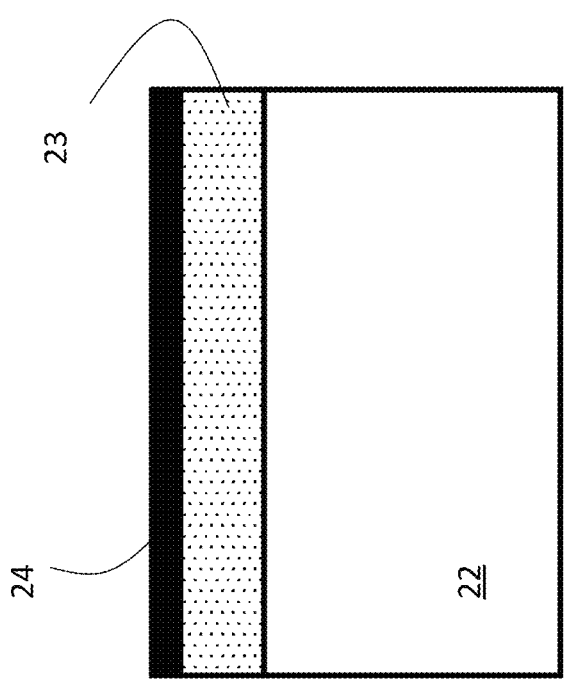
Figure 13B:
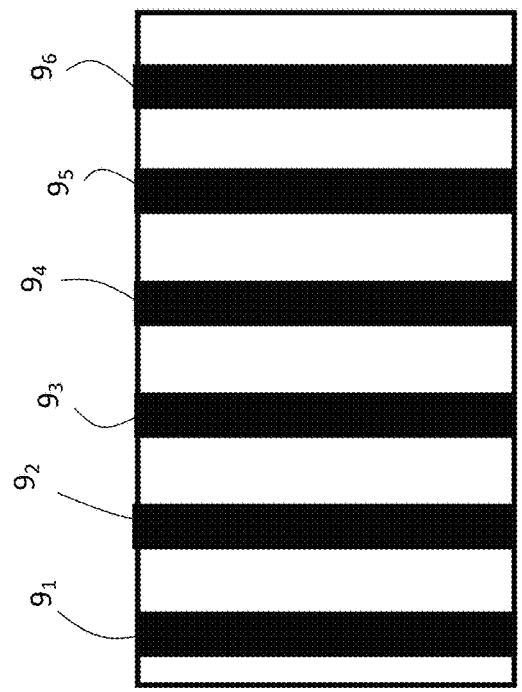
FIGS. 13A, 13B and 13C are side, top and end views, respectively, illustrating a second step in the exemplary method of manufacturing the grating based emitter of the present invention.
Figure 13C:
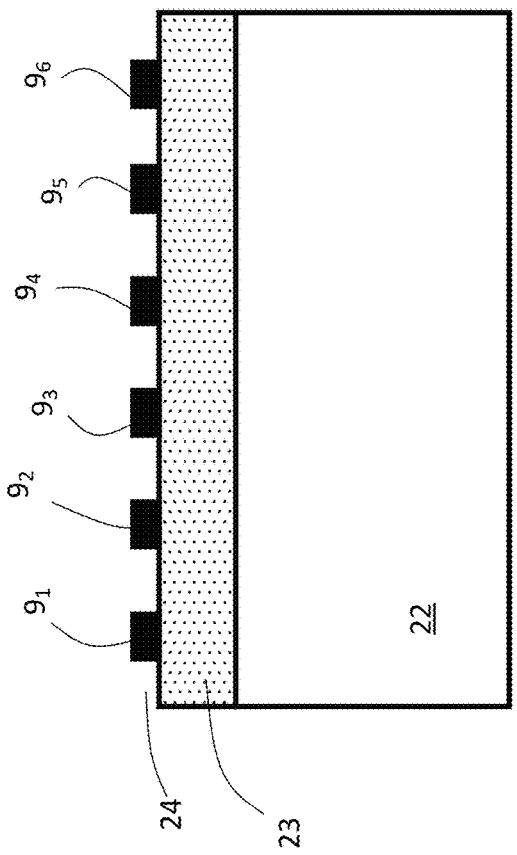
Figure 13A:
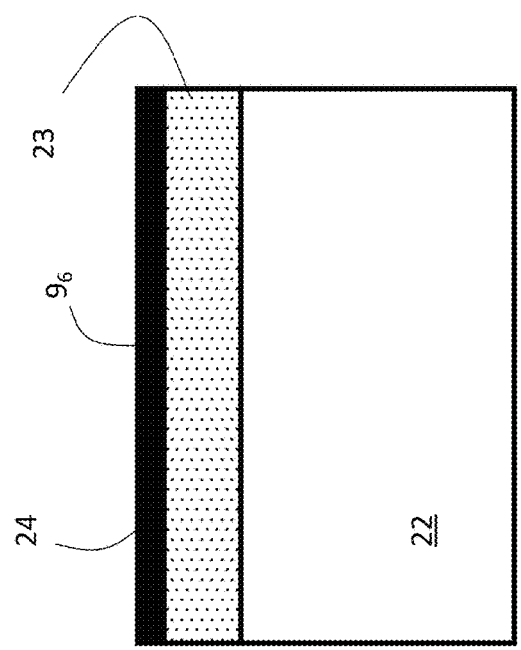
Figure 14B:
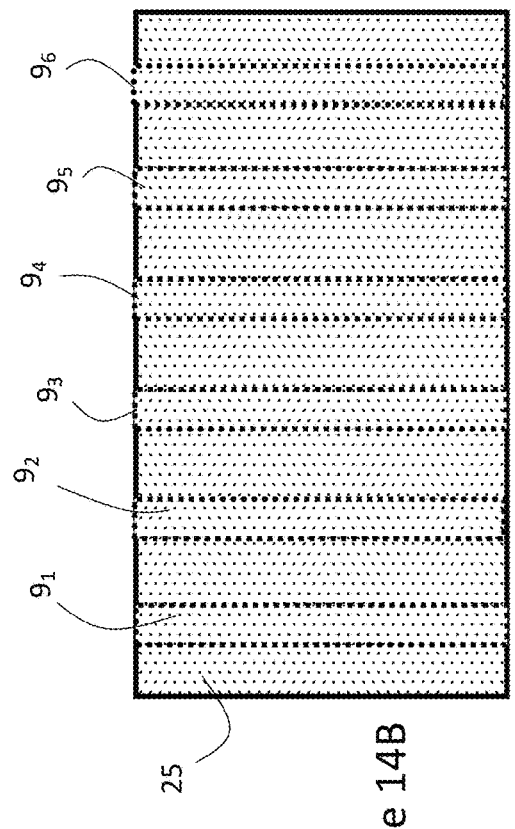
FIGS. 14A, 14B and 14C are side, top and end views, respectively, illustrating a third step in the exemplary method of manufacturing the grating based emitter of the present invention.
Figure 14C:
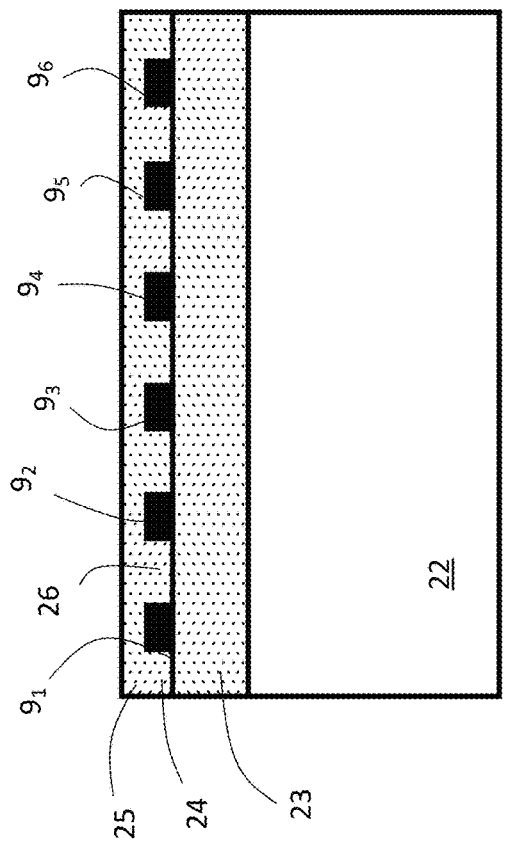
Figure 14A:
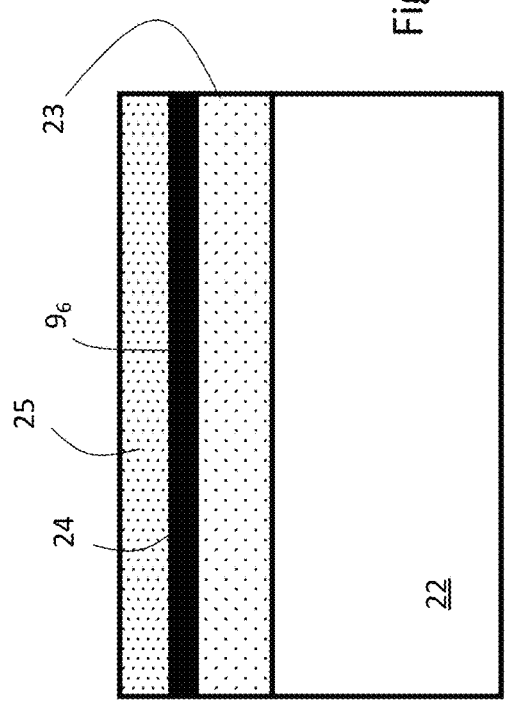

FIG. 11 illustrates an alternative embodiment in which a grating layer 127 for a grating based emitter 121, includes gratings 130 that are formed by pillars 131 created in the grating layer 127 by removing the grating layer material from the trenches 126 in between the output waveguides $9_1$ to $9_n$ except for the, e.g. rectangular, pillars 131 and over the output waveguides $9_1$ to $9_n$. The pillars 131 may comprise an array of pillars 131 comprising a plurality of equally-spaced columns of pillars, one of the plurality of pillars extending over each trench 126, and a plurality of equally-spaced rows of pillars separated by and extending perpendicular to the trenches 126. The removed areas may be filled with a lower index of refraction material, such as the material in the upper cladding layer 25. Apodization of the grating layer 127 may be provided by decreasing the widths of at least some of the pillars 131 along a column of pillars 131. For example, in the grating based emitter 121, with the gratings 130, the pillars 131 that may have the same period, i.e. same distance from the leading edge of one pillar 131 to the leading edge of the next pillar 131, and may have the same pitch, i.e. same length of pillar 131 in the transmission direction, the widths of the pillars 131, i.e. perpendicular to the transmission direction, may be gradually decreased as the distance from the light source 3 increases. Pillars 131 closest to the light source 3 may be starting at approximately 50%-75% of the width of the trench 126, with pillar 131 moving to approximately 20%-30% of width of the trench 126 by the outer free ends of the output waveguides $9_1$ to $9_n$. Accordingly, the grating strength is tunable by over two orders of magnitude, allowing for significant apodization of the gratings 130 along the aperture. If stronger gratings 130 are required, wider pillars may be included, e.g. including pillars 131 that extend the entire width of the trenches 126. Tapered inputs 41 may also be included in the grating based emitter 121.

With reference to FIGS. 12 to 16, a multi-layer deposition process may be used to form the grating based emitters 21, 21' and 121, including the grating layer 27, 27' and 127 and the underlying output waveguides $9_1$ to $9_n$. Starting with a first wafer, e.g. silicon, the lower cladding layer 23 is formed, e.g. by surface oxidation of an upper portion of the wafer, and then a second wafer, e.g. silicon, is mounted on the lower cladding layer 23. The second wafer is processed, e.g. cut, etched and/or polished, to form a solid layer of waveguide material, i.e. the waveguide layer 24 over the lower cladding layer 23, whereby the remaining silicon portion of the first wafer forms the substrate 22. Alternatively, the lower cladding layer 23 is flip chip bonded onto a separate handle wafer forming the substrate 22, and a portion of the original wafer is processed, e.g. cut, to form the waveguide layer 24. For example an silicon on insulator (SOI) wafer with a 200 nm-300 nm, preferably 220 nm, silicon device layer, e.g. waveguide layer 24, and a 2 μm to 4 μm, preferably 3 μm, buried oxide layer, e.g. lower cladding layer 23. The output waveguides $9_1$ to $9_n$ are then patterned, e.g. using deep-UV lithography, and etched, as in FIGS. 13A to 13C, forming trenches 26 down to the lower cladding layer 24 between the output waveguides $9_1$ to $9_n$. Preferably, the output waveguides $9_1$ to $9_n$ include a width of 1.0 μm to 1.5 preferably 1.3 and a pitch of 1.7 μm to 2.2 preferably 2 i.e. trench widths of 0.7 μm to 1.2 FIGS. 14A to 14C illustrate deposition of the upper cladding layer 25, e.g. a material with a lower index of refraction than the waveguide layer 24, such as a dielectric or oxide material, e.g. $SiO_2$, over top of the output waveguides $9_1$ to $9_n$ and in the trenches 26 between the output waveguides $9_1$ to $9_n$. The upper cladding layer 25 has a final thickness of between 0 nm and 300 nm, preferably 100 nm, measured from the top surface of the output waveguides $9_1$ to $9_n$ to the top surface of the upper cladding layer 25. Typically, the upper cladding layer 25 is deposited in a conformal process with a thickness greater than the final target thickness, and then polished so that the upper surface is flat and so that the thickness is reduced to the final target thickness.

Figure 15B:
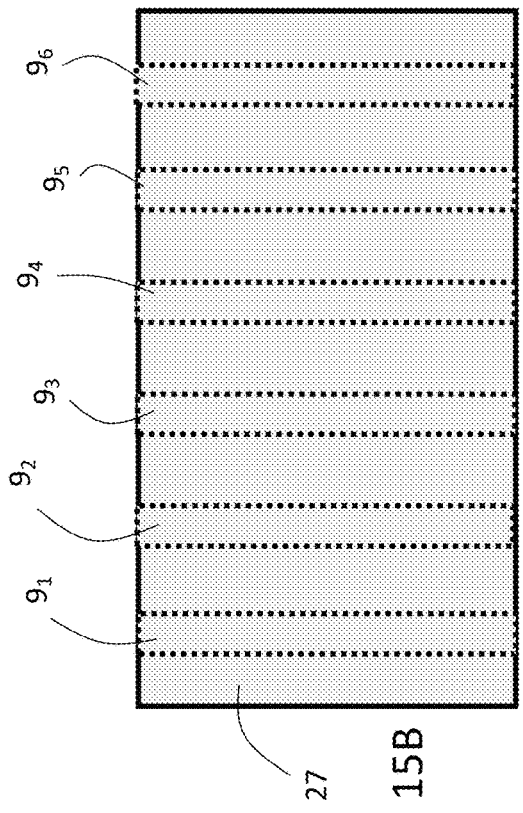
FIGS. 15A, 15B and 15C are side, top and end views, respectively, illustrating a fourth step in the exemplary method of manufacturing the grating based emitter of the present invention.
Figure 15C:
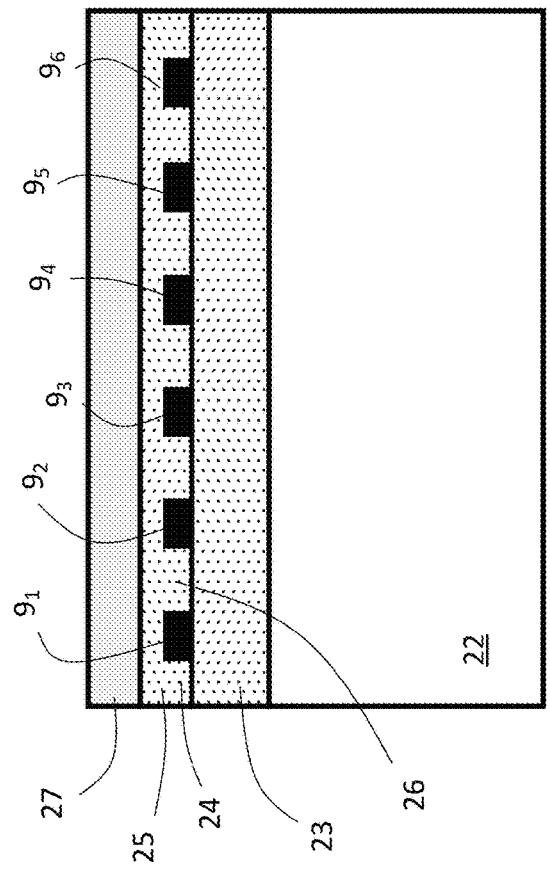
Figure 15A:
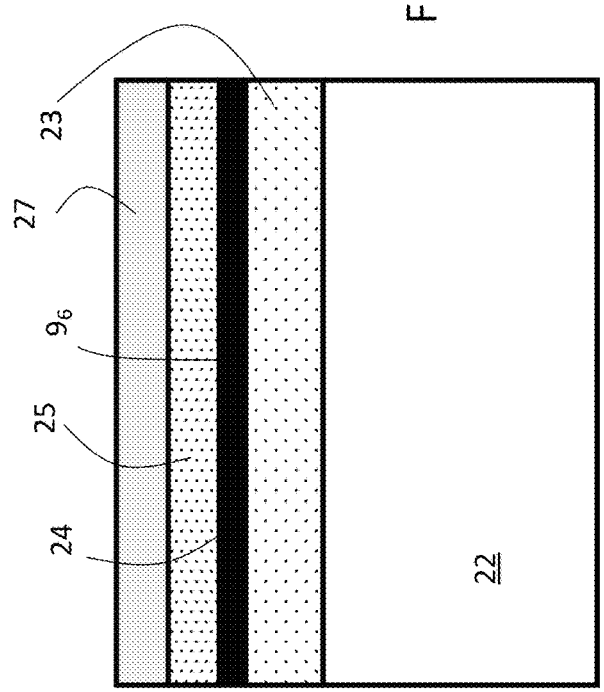

FIGS. 15A to 15C illustrate the provision of the grating layer 27, comprising a material with an index of refraction between that of the waveguide layer 24 and the upper cladding layer 25, e.g. n=2-3, such as silicon nitride ($Si_3N_4$ or SiN). The grating layer 27 may comprise a thickness between 50 nm and 500 nm, but preferably approximately 300 nm to 400 nm.

Figure 16B:
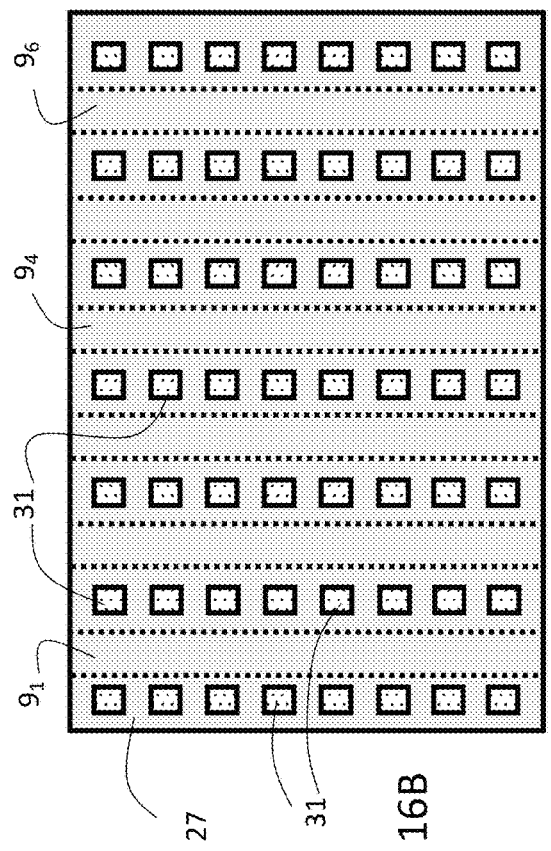
FIGS. 16A, 16B and 16C are side, top and end views, respectively, illustrating a fifth step in the exemplary method of manufacturing the grating based emitter of the present invention.
Figure 16C:
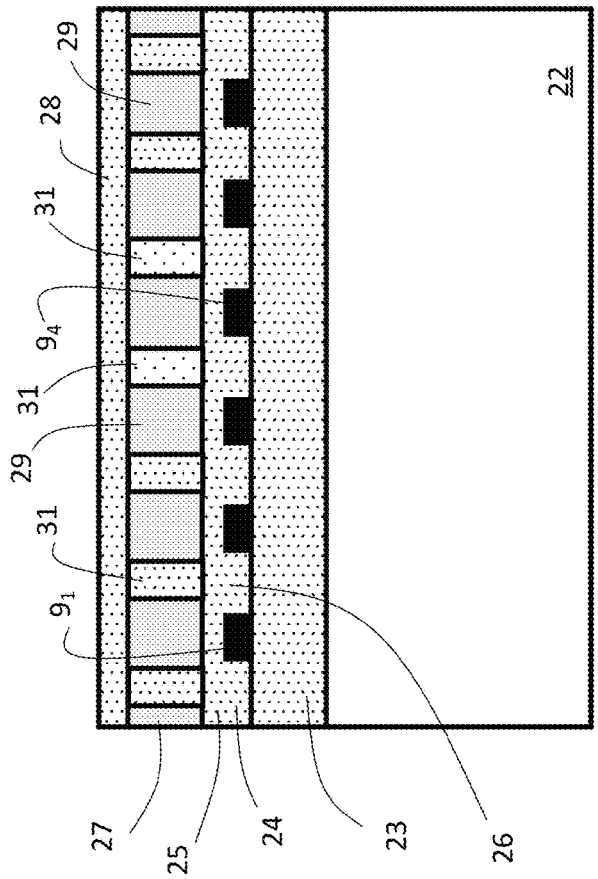
Figure 16A:
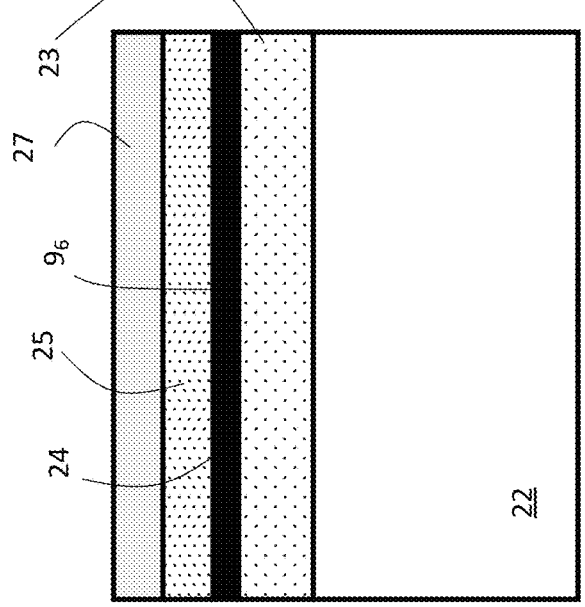

FIGS. 16A to 16C illustrate the step of etching the slots 31 from the grating layer 27, preferably down to the upper cladding layer 25, and then optionally filling the removed sections with a dielectric material, e.g. the same material as the upper cladding layer 25, an optionally forming cover cladding layer 28. Preferably, the slots 31 include a constant 500 nm-750 nm, preferably 600 nm, grating period, and a constant 50% grating duty cycle in the transmission direction. Typically, the filling and cover cladding layer 28 are deposited in a conformal process with a thickness greater than the final target thickness, and then polished so that the upper surface is flat and so that the thickness is reduced to the final target thickness.

Figure 17B:
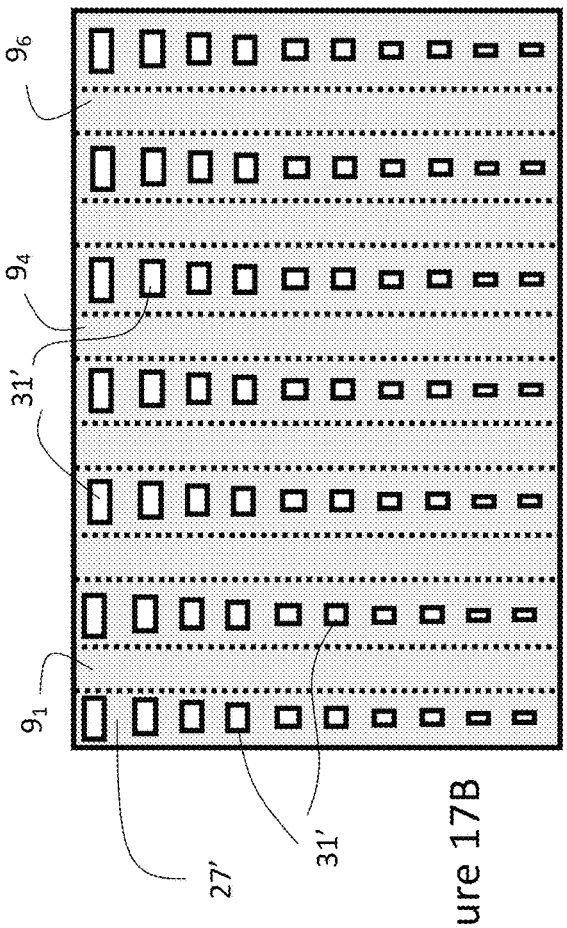
FIGS. 17A, 17B and 17C are side, top and end views, respectively, illustrating an alternative fifth step in the exemplary method of manufacturing the grating based emitter of the present invention.
Figure 17A:
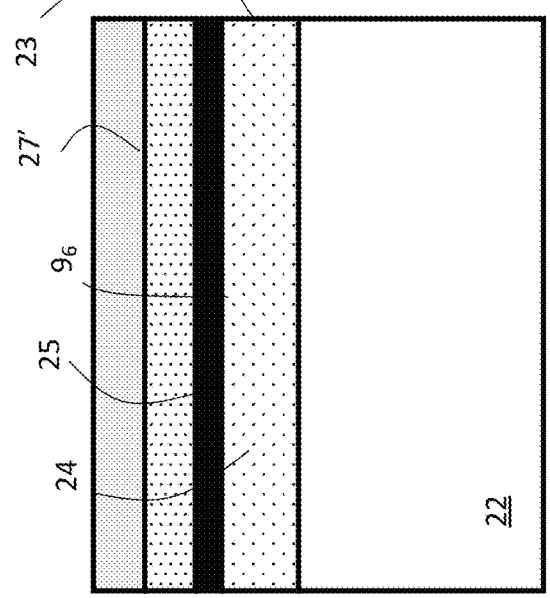
Figure 17C:
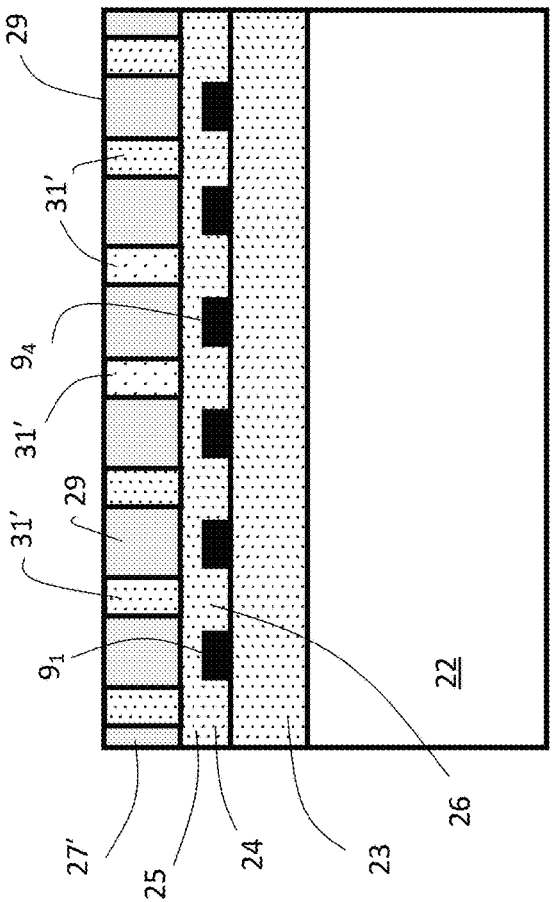

Alternatively, as illustrated in FIGS. 17A to 17C, a step of etching the slots may be included in which the slots 31' are etched with varying widths, e.g. 0.6 μm to 2.0 Slots 31' closest to the light source 3 may be starting at approximately 20%-30% of the width of the trench 26, with slots 31' moving to approximately 50%-75% of width of the trench 26 by the outer free ends of the output waveguides $9_1$ to $9_n$. However, slots 31' may extend the entire width of the trench or even wider than the width of the trench 26, i.e. partially over top of the output waveguides $9_1$ to $9_n$, as with slots 31" above. Preferably, the slots 31' and 31" include a constant 500 nm-750 nm, preferably 600 nm, grating period, and a constant 50% grating duty cycle in the transmission direction.

Additional steps may include patterning and etching the tapered inputs 41 in the grating layer 27 down to the upper cladding layer 25, as in FIG. 9 or 10.

FIGS. 18A to 18C illustrate an alternative etching step, in which the pillars 131 are formed, instead of the slots 31', by etching the grating layer 27 in the area around the pillars 131 down to the upper cladding layer 25. Pillars 131 closest to the light source 3 may be starting at approximately 50%-75% of the width of the trench 26, with pillar 131 moving to approximately 20%-30% of width of the trench 26 by the outer free ends of the output waveguides $9_1$ to $9_n$. Accordingly, the grating strength is tunable by over two orders of magnitude, allowing for significant apodization of the gratings 130 along the aperture. If weaker gratings 130 are required, wider pillars 131, e.g. 75%-100% of the width of the trenches 26, may be included close to the light source 3, e.g. including pillars 131 that extend the entire width of the trenches 26. If stronger gratings are required, narrower pillars 131, e.g. 0%-20% of the width of the trench 26, may be included, e.g. including removing all of the grating layer 27 over the trenches 26. Tapered inputs 41 may also be included in the grating based emitter 121, as in FIG. 11.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An optical phased array comprising:
a light source for launching a beam of light;
a splitting network of waveguides, including an input and a plurality of outputs, configured to separate the beam of light into a plurality of sub-beams;
a plurality of optical phase shifters configured for adjusting a phase of each of the sub-beams;
an emitter comprising:
a lower cladding layer;
a plurality of output waveguides optically coupled to the plurality of outputs, with trenches therebetween, each output waveguide extending in a transmission direction from an inner end proximate the light source to an outer free end;
an upper cladding layer over the plurality of output waveguides;
a grating layer over the upper cladding layer;
an array of slots in the grating layer, comprising a plurality of columns of slots and a plurality of rows of slots extending down to the upper cladding layer above the trenches, configured to form a diffraction grating for directing light out of the output waveguides at an angle thereto.

2. The optical phased array according to claim 1, wherein each column of slots comprises a constant pitch in the transmission direction.

3. The optical phased array according to claim 2, wherein each column of slots comprises a constant duty cycle.

4. The optical phased array according to claim 3, wherein each column of slots comprises slots varying in width.

5. The optical phased array according to claim 3, wherein each column of slots comprises at least some slots gradually increasing in width in the transmission direction.

6. The optical phased array according to claim 5, wherein at least one row of slots includes at least some slots comprising widths that extend across the trench.

7. The optical phased array according to claim 5, wherein at least one row of slots includes wider slots comprising widths that extend across the trench and over top of adjacent output waveguides.

8. The optical phased array according to claim 3, wherein each row of slots includes slots comprising widths that extend across the trench.

9. The optical phased array according to claim 3, wherein each row of slots includes wider slots comprising widths that extend across the trench and over top of adjacent output waveguides.

10. The optical phased array according to claim 1, further comprising tapered inputs to the output waveguides to the grating layer;
wherein the tapered inputs converge over the output waveguides.

11. The optical phased array according to claim 1, further comprising tapered inputs to the output waveguides to the grating layer;
wherein the tapered inputs converge over the trenches.

12. An optical phased array comprising:
a light source for launching a beam of light;
a splitting network of waveguides, including an input and a plurality of outputs, configured to separate the beam of light into a plurality of sub-beams;
a plurality of optical phase shifters configured for adjusting a phase of each of the sub-beams;
an emitter comprising:
a lower cladding layer;
a plurality of output waveguides optically coupled to the plurality of outputs, with trenches therebetween, each output waveguide extending in a transmission direction from an inner end proximate the light source to an outer free end;
an upper cladding layer over the plurality of output waveguides;
a grating layer over the upper cladding layer;
an array of pillars in the grating layer, comprising a plurality of columns of pillars and a plurality of rows of pillars extending down to the upper cladding layer above the trenches between the output waveguides, configured to form a diffraction grating for directing light out of the output waveguides at an angle thereto.

13. The optical phased array according to claim 12, wherein each column of pillars comprises a constant pitch in the transmission direction.

14. The optical phased array according to claim 13, wherein each column of pillars comprises a constant duty cycle.

15. The optical phased array according to claim 14, wherein each column of pillars comprises at least some of the pillars varying in width.

16. The optical phased array according to claim 14, wherein each column of pillars comprises at least some of the pillars gradually decreasing in width in the transmission direction.

17. The optical phased array according to claim 12, further comprising tapered inputs to the output waveguides to the grating layer;
wherein the tapered inputs converge over the output waveguides.

18. The optical phased array according to claim 12, further comprising tapered inputs to the output waveguides to the grating layer;
 wherein the tapered inputs converge over the trenches.

19. A method of manufacturing an integrated optical waveguide emitter comprising:
 providing an array of output waveguides comprised of a first material comprising a first index of refraction with trenches therebetween on a lower cladding layer;
 providing an upper cladding layer comprised of a second material comprising a second index of refraction lower than the first index of refraction over the array of output waveguides;
 providing a grating layer over the upper cladding layer, the grating layer comprised of a third material with a third index of refraction between the first index of refraction and the second index of refraction;
 forming an array of slots in the grating layer, comprising a plurality of lines of slots and a plurality of rows of slots extending down to the upper cladding layer only above the trenches between the output waveguides, configured to form a diffraction grating for directing light out of the output waveguides at an angle thereto.

20. The method according to claim 19, wherein the plurality of slots comprises a constant pitch in a transmission direction;
 wherein the plurality of slots comprises a constant duty cycle; and
 wherein each row of slots comprises slots comprising widths that increase in width in the transmission direction.

\* \* \* \* \*

UNITED STATES PATENT AND TRADEMARK OFFICE
CERTIFICATE OF CORRECTION

PATENT NO. : 10,983,273 B1
APPLICATION NO. : 16/946448
DATED : April 20, 2021
INVENTOR(S) : Christopher T. Phare It is certified that error appears in the above-identified patent and that said Letters Patent is hereby corrected as shown below:

In the Specification

Column 4, Line 33:
Delete "haven", insert --have n--

Column 8, Lines 20 to 21:
Delete "1.5 preferably 1.3 and a pitch of 1.7 µm to 2.2 preferably 2 i.e. trench widths of 0.7 µm to 1.2", insert --1.5 µm, preferably 1.3 µm, and a pitch of 1.7 µm to 2.2 µm, preferably 2 µm, i.e. trench widths of 0.7 µm to 1.2 µm.--

Column 8, Lines 20 to 21:
Delete "0.6 µm to 2.0", insert --0.6 µm to 2.0 µm.--

Signed and Sealed this
Fourth Day of July, 2023

Katherine Kelly Vidal
*Director of the United States Patent and Trademark Office*